United States Patent
An et al.

(10) Patent No.: US 9,793,985 B2
(45) Date of Patent: Oct. 17, 2017

(54) OBTN TIME SLOT LENGTH ADJUSTMENT METHOD, DEVICE AND NODE

(71) Applicant: ZTE Corporation, Shenzhen (CN)

(72) Inventors: Gaofeng An, Shenzhen (CN); Yingchun Shang, Shenzhen (CN)

(73) Assignee: Xi'An Zhongxing New Software Co.Ltd., Xi'An (CN)

( * ) Notice: Subject to any disclaimer, the term of this patent is extended or adjusted under 35 U.S.C. 154(b) by 0 days.

(21) Appl. No.: 15/100,703

(22) PCT Filed: Jun. 16, 2014

(86) PCT No.: PCT/CN2014/080005
§ 371 (c)(1),
(2) Date: Jul. 7, 2016

(87) PCT Pub. No.: WO2014/183725
PCT Pub. Date: Nov. 20, 2014

(65) Prior Publication Data
US 2016/0308610 A1    Oct. 20, 2016

(30) Foreign Application Priority Data

Dec. 5, 2013 (CN) .......................... 2013 1 0655183

(51) Int. Cl.
*H04B 10/079* (2013.01)
*H04Q 11/00* (2006.01)

(52) U.S. Cl.
CPC ..... *H04B 10/0795* (2013.01); *H04Q 11/0066* (2013.01); *H04Q 11/0067* (2013.01);
(Continued)

(58) Field of Classification Search
CPC ........... H04B 10/0795; H04Q 11/0067; H04Q 2011/0073
See application file for complete search history.

(56) References Cited

U.S. PATENT DOCUMENTS

| 5,946,315 A | 8/1999 | Ramfelt |
| 7,009,991 B2 * | 3/2006 | Shachar ................. H04L 12/43 370/436 |

(Continued)

FOREIGN PATENT DOCUMENTS

| CN | 1285103 A | 2/2001 |
| CN | 1725712 A | 1/2006 |
| CN | 101959083 A | 1/2011 |

OTHER PUBLICATIONS

International Search Report in international application No. PCT/CN2014/080005, mailed on Sep. 16, 2014.
(Continued)

*Primary Examiner* — Rasheed Gidado
(74) *Attorney, Agent, or Firm* — Oppedahl Patent Law Firm LLC

(57) ABSTRACT

Disclosed are an optical burst transport network (OBTN) time slot length adjustment method, device and node, the method comprising: during OBTN initialization, measuring the circumference of a data channel, and calculating the OB time slot length according to the measurement result; and during the normal operation of an OBTN, conducting real-time detection on the circumference variation of the OBTN data channel, comparing a variation value with a preset threshold, and correspondingly processing the OB time slot length according to the comparison result. The device is disposed on the node and comprises: a circumference measurement module of the data channel, a time slot length calculation and adjustment module, and a detection module, the circumference measurement module being configured to measure the circumference of the data channel, the time slot length calculation and adjustment module being configured to calculate the OB time slot length according to the circumference measurement result, and correspondingly process the OB time slot length according to the comparison (Continued)

result of the detection module, and the detection module being configured to compare the circumference variation value with the preset threshold.

20 Claims, 5 Drawing Sheets

(52) U.S. Cl.
CPC ............. *H04Q 2011/0064* (2013.01); *H04Q 2011/0073* (2013.01); *H04Q 2011/0092* (2013.01)

(56) References Cited

U.S. PATENT DOCUMENTS

| | | | | |
|---|---|---|---|---|
| 7,826,747 B2* | 11/2010 | Su | ................ | H04J 14/0206 398/48 |
| 7,949,217 B2* | 5/2011 | Glebov | ................ | G02F 1/2955 385/16 |
| 8,577,221 B2* | 11/2013 | McDonald | ................ | H04J 14/0283 398/25 |
| 2015/0071637 A1* | 3/2015 | Deng | ................ | H04J 3/1658 398/52 |
| 2015/0372931 A1* | 12/2015 | Puleri | ................ | H04Q 11/0066 398/47 |

OTHER PUBLICATIONS

English Translation of the Written Opinion of the International Search Authority in international application No. PCT/CN2014/080005, mailed on Sep. 16, 2014.

Supplementary European Search Report in European application No. 14798174.0, mailed on Oct. 19, 2016.

Miros AW Klinkowski et al: "Performance Overview of the Offset Time Emulated OBS Network Architecture", Journal of Lightwave Technology, IEEE Service Center, New York, NY, US, vol. PP, No. 14, Jul. 15, 2009 (Jul. 15, 2009), pp. 2751-2764, XP011264302, ISSN: 0733-8724, mailed on Jul. 15, 2009.

Rugsachart A et a l: "An analysis of time-synchronized optical burst switching", 2006 Workshop on High Performance Switching and Routing Jun. 7-9, 2006, Piscataway, NJ, USA, IEEE, Jun. 7, 2006 (Jun. 7, 2006), pp. 365-370, XP010943610, ISBN: 978-0-7803-9569-5, mailed on Jun. 7, 2006.

\* cited by examiner

OBTN TIME SLOT LENGTH ADJUSTMENT METHOD, DEVICE AND NODE

TECHNICAL FIELD

The disclosure relates to the technical field of optical networks, and in particular to a method, apparatus and a node for adjusting a timeslot length of an Optical Burst Transport Network (OBTN).

BACKGROUND

With the explosive increasing of global data traffic, emerging services, representative of which are video and streaming media services, develop rapidly, thereby making dynamic data services with high bandwidth and high quality requirements become a traffic subject of a network, and driving that the network is evolved toward packetization. It can be seen, in term of a transport network, as a result of a network traffic datamation development, a circuit switching network of a traditional Synchronous Digital Hierarchy (SDH) is developed to an SDH-based Multi-Service Transfer Platform (MSTP) having a multi-service access function which is gradually evolved into an existing Packet Transport Network (PTN). Fundamentally, the circuit switching network only provides rigid-pipeline and coarse-granularity switching, which cannot effectively meet dynamic and burst requirements of the data services, and flexible-pipeline and statistical-multiplexing characteristics of a packet switching network well adapt to the data services. However, current packet switching is basically based on processing on an electric layer, which is high in cost and large in energy consumption; along with the rapid increase of traffic, the processing bottlenecks emerge day by day; and the current packet switching is difficult to adapt to demands for high speed, flexibility, low cost and low energy consumption of a future network. An optical network has the advantages of low cost, low energy consumption, high speed and large capacity. However, a traditional optical circuit switching network such as a Wavelength Division Multiplexing (WDM) network and an Optical Transport Network (OTN) is only capable of providing a large-granularity rigid pipeline, is short of flexibility in electric packet switching, and cannot effectively carry the data services.

An OBTN adopts an Optical Burst (OB)-based all optical switching technology, has abilities to provide space optical layer bandwidths as needed by any network nodes and to perform quick scheduling, can achieve dynamic adaption to and good support for various traffic scenarios such as a south-north burst traffic scenario and an east-west burst traffic scenario, can improve the utilization efficiency of resources and the network flexibility, retains the advantages of high speed, large capacity and low cost of an optical layer, and is applied to various network topologies such as star/tree/ring-shaped network topologies. Meanwhile, a data channel and a control channel perform transfer using different wavelengths, such that it is very convenient to separately process a control signal and a data signal.

The OBTN is divided into a timeslot synchronization network and a non-timeslot synchronization network. A packet in the timeslot synchronization network has a fixed length and is transmitted within a fixed timeslot; and the non-timeslot synchronization network is asynchronous, and a packet has a variable length and does not have a concept of timeslots. The disclosure aims at an optical timeslot synchronization network.

In the timeslot synchronization network, timeslots are rotationally distributed on a loop network, and a full-network synchronization solution is required to synchronize timeslot boundaries. The number of the timeslots in the loop network shall be an integer, and if the number of the timeslots in the loop network is not an integer, timeslot overlapping will occur, which causes a collision. In order to facilitate the loop network timeslot synchronization of the OBTN without the timeslot collisions, it is needed to set a loop length to a timeslot length namely an integral multiple of a timeslot length of an OB.

In order that the number of the timeslots on the loop network is an integer, the length of the loop network or the lengths of the timeslots can be changed. Currently, it is usually needed to configure an OB switching network with a Fibre Delay Line (FDL) in order that a loop length reaches a certain fixed length. If the loop length is an integral multiple of the timeslot length, it is needed to achieve a certain relationship between a data frame and a control frame by means of the FDL inside a node, so that the node receives the control frame prior to the data frame by a certain time length. Moreover, it is required that OB packets must be of a fixed length and a guard interval between the OB packets is also of a fixed length. During the configuration of the FDL, a matched optical switch is also needed, which may make the network design complicated; and the control over the length of the FDL is relatively complex, an accurate time length cannot be achieved, certain losses of optical power will be caused, certain difficulties in the timeslot synchronization of the node will be caused, and the network maintenance is not stable enough. These problems make control over the OBTN in construction and operation processes complicated, thereby being bad for achieving a synchronization function and synchronization management.

SUMMARY

In view of this, the embodiments of the disclosure are mainly intended to provide a method, apparatus, and a node for adjusting a timeslot length of an OBTN, which can solve the problems of complicated control, high cost, insufficient control over accuracy and the like caused by the fact that the loop length is set to an integral multiple of an OB timeslot length by using FDL in the traditional art.

To this end, the technical solutions of the embodiments of the disclosure are implemented as follows.

An embodiment of the disclosure provides a method for adjusting a timeslot length of an OBTN, which may include that:

during the initialization of an OBTN, a loop length of a data channel is measured, and an OB timeslot length is calculated according to a result of the measurement; and during the normal operation of the OBTN, a variation of the loop length of the data channel of the OBTN is detected in real time, a value of the variation is compared with a pre-set threshold, and the OB timeslot length is correspondingly processed according to a result of the comparison.

In that case, the step that the loop length of the data channel is measured may include that:

a node sends an OB packet to a master node, and the master node receives the OB packet at successive two times $t_1$ and $t_2$ respectively, the loop length is obtained according to $t_L = t_2 - t_1$.

In that case, the OB timeslot length may be calculated according to the result of the measurement of the loop length by means of the following formulae:

$$t_L = (T+T_1) \times N,\ T \le T_{max},\ T_1 \times N \text{ being as least as possible, and } T_1 \ge T_{1min},$$

where $t_L$ may represent a loop length of a data channel, T may represent the length of the OB packet, $T_1$ may represent a guard interval between the OB packets, $T+T_1$ may represent an OB timeslot length, and N may be a positive integer and may represent that $t_L$ is a multiple of an OB timeslot length; $T_{max}$ may represent a maximum value of the length of the OB packet; and $T_{1min}$ may represent a minimum value of the guard interval between the OB packets.

In that case, the step that the value of the variation is compared with the pre-set threshold and the OB timeslot length is correspondingly processed according to the result of the comparison may include that:

when the loop length of the data channel is decreased by $\Delta t_L$, the OB timeslot length may be adjusted according to methods in which:

when $\Delta t_L <$ a first threshold, the master node sends control frames and data frames in a current manner;

when the first threshold $\le \Delta t_L <$ a second threshold, the master node sends a control frame and a data frame $\Delta t_L$ in advance as first frames in each loop cycle, and sends a last control frame, which is reduced by an idle code having a time length of $\Delta t_L$, in each loop cycle;

when the second threshold $\le \Delta t_L <$ a third threshold, the master node decreases a value of T or $T_1$ by $\Delta t_L/N$ and N is remained unchanged to make the loop length equal to an integral multiple of the OB timeslot length, and if the requirement of the integral multiple is not met, time at which the control frames are sent is adjusted in accordance with the previous two methods; and when $\Delta t_L \ge$ the third threshold, the master node re-calculates at least one of N, T and $T_1$, in order to make the loop length equal to the integral multiple of the OB timeslot length again.

In that case, the step that the value of the variation is compared with the pre-set threshold and the OB timeslot length is correspondingly processed according to the result of the comparison may include that:

when the loop length of the data channel is increased by $\Delta t_L$, the OB timeslot length may be adjusted according to methods in which:

when $\Delta t_L <$ a first threshold, the master node sends control frames and data frames in a current manner;

when the first threshold $\le \Delta t_L <$ a second threshold, the master node sends a control frame and a data frame by delaying for $\Delta t_L$ as first frames in each loop cycle, and sends a last control frame, which comprises an additional idle code having a time length of $\Delta t_L$, in each loop cycle;

when the second threshold $\le \Delta t_L <$ a third threshold, the master node increases a value of T or $T_1$ by $\Delta t_L/N$ and N is remained unchanged to make the loop length equal to an integral multiple of the OB timeslot length, and if the requirement of the integral multiple is not met, time at which the control frames are sent is adjusted in accordance with the previous two methods; and when $\Delta t_L \ge$ the third threshold, the master node re-calculates at least one of N, T and $T_1$, in order to make the loop length equal to the integral multiple of the OB timeslot length again.

Preferably, the method for adjusting a timeslot length of an OBTN may further include:

a step of measuring, during the initialization of the OBTN, a loop length of a control channel, which may include that:

the master node sends a header of a control frame at time $t_3$, and after the control frame are sequentially transferred by respective nodes in a loop network, the master node receives the header of the control frame at time $t_4$, and then the loop length of the control channel is $t_4-t_3$.

An embodiment of the disclosure also provides an apparatus for adjusting a timeslot length of an OBTN, which may include: a data channel loop length measurement module, a timeslot length calculation and adjustment module and a detection module, wherein the data channel loop length measurement module may be configured to measure, during the initialization and normal operation of an OBTN, a loop length of a data channel;

the timeslot length calculation and adjustment module may be configured to calculate, during the initialization of the OBTN, an OB timeslot length according to a loop length measured by the data channel loop length measurement module, and correspondingly process, during the normal operation of the OBTN, the OB timeslot length according to a result of comparison of the detection module; and the detection module may be configured to detect, in real time, during the normal operation of the OBTN, a variation of the loop length measured by the data channel loop length measurement module, and compare a value of the variation with a pre-set threshold.

Preferably, the apparatus may further include: a control channel loop length measurement module, configured to measure, during the initialization of the OBTN, a loop length of a control channel.

An embodiment of the disclosure also provides a node, which may be located in an OBTN and may include the apparatus mentioned above.

An embodiment of the disclosure also provides a computer storage medium. Computer executable instructions may be stored in the computer storage medium and may be configured to execute the above mentioned method for adjusting a timeslot length of an OBTN.

By means of the method, apparatus and node for adjusting a timeslot length of an OBTN provided by the embodiments of the disclosure, during the initialization of the OBTN, the loop length of the data channel is measured, and the OB timeslot length is calculated according to the result of the measurement; and during the normal operation of the OBTN, the variation of the loop length of the data channel of the OBTN is detected in real time, the value of the variation is compared with the pre-set threshold, and the OB timeslot length is correspondingly processed according to the result of the comparison. Thus, it is achieved that the loop length is an integral multiple of the OB timeslot length which provide a basis for a later synchronization relationship between the data frame and the control frame. According to the embodiments of the disclosure, it is not necessary to provide FDL, the problems of complicated control, high cost, insufficient control over accuracy and the like caused by the fact that the loop length is set to an integral multiple of an OB timeslot length by using FDL in the traditional art are solved.

DETAILED DESCRIPTION

In order to facilitate management, in an OBTN, timeslots on a loop network are usually managed by using data frames, bandwidth request and allocation results are transferred by using control frames, and these pieces of management information will be generated by a master node. Except for the master node, other nodes are slave nodes. The slave nodes send bandwidth request information to the master node, and the master node performs calculation according to the bandwidth request information of each slave node and allocable network resources, and allocates a bandwidth map to each slave node.

The OBTN is applied to the loop network, a manner of centralized control is adopted, transmitting and receiving are performed in synchronous timings, and it is needed to accurately test a loop length and calculate an OB timeslot length, thereby ensuring that the loop length is an integral multiple of the OB timeslot length. In addition, the loop length varies equivalently due to aging of an optical fibre and varying of an environment temperature, so that after the loop length is detected for the first time, it is also needed to detect the loop length in real time.

In the embodiments of the disclosure, during the initialization of an OBTN, a loop length of a data channel is measured, and an OB timeslot length is calculated according to a result of the measurement; and during the normal operation of the OBTN, a variation of the loop length of the data channel of the OBTN is detected in real time, a value of the variation is compared with a pre-set threshold, and the OB timeslot length is correspondingly processed according to a result of the comparison.

The disclosure is further described in detail below with reference to drawings and specific embodiments.

Figure 1:
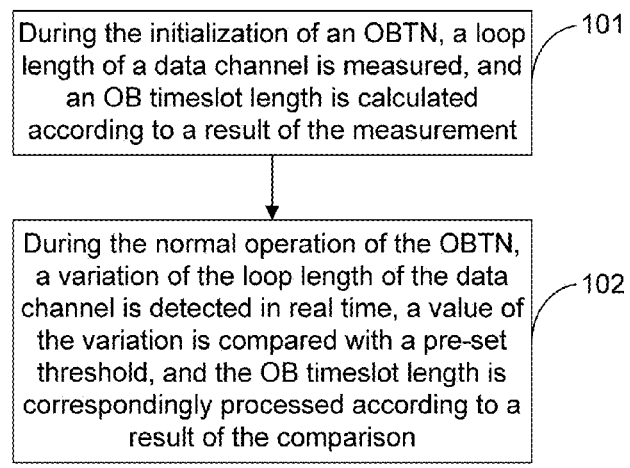
FIG. 1 is a schematic flowchart of an implementation of a method for adjusting a timeslot length of an OBTN according to an embodiment of the disclosure.

As shown in FIG. 1, in an embodiment of the disclosure, a method for adjusting a timeslot length of an OBTN is provided, which includes the steps as follows.

Step 101: During the initialization of an OBTN, a loop length of a data channel is measured, and an OB timeslot length is calculated according to a result of the measurement.

Here, an OB packet is transmitted via the data channel of the OBTN. In order to achieve loop length measurement of the data channel of the OBTN, a master node needs to count transfer time, excluding delay time of uplink and downlink optical fibres and a logical circuit in each node, of the OB packet in the data channel by sending and receiving the OB packet, the loop length of the data channel is measured in the following manner that:

a certain node (such as the master node or a slave node) is allowed to send the OB packet to the master node, the master node receives the OB packet at two successive times $t_1$ and $t_2$ respectively, the loop length is obtained according to $t_L = t_2 - t_1$.

After an accurate loop length $t_L$ of the data channel is measured, an OB timeslot length is calculated, and it can be achieved that the loop length of the data channel is an integral multiple of the OB timeslot length. It is assumed that the loop length $t_L$ is N times as large as the OB timeslot length and the OB timeslot length includes: a length T of an OB packet and a guard interval $T_1$ between the OB packets, calculation formulae of a burst timeslot length are as follows.

$$t_L = (T + T_1) \times N \quad (1),$$

$$T \leq T_{max} \quad (2),$$

$$T_1 \times N \text{ being as least as possible} \quad (3), \text{ and}$$

$$T_1 \geq T_{1min} \quad (4).$$

Where the formula (1) represents that a requirement that the loop length $t_L$ is an integral multiple of the OB timeslot length is met; the formula (2) represents that the length of the OB packet is less than or equal to a maximum value of the length of the OB packet, or the length of the OB packet may be a fixed value; the formula (3) represents that a principle of highest bandwidth efficiency is satisfied; and the formula (4) represents that the guard interval $T_1$ must be greater than or equal to a minimum value $T_{1min}$ of the guard interval.

Thus, in accordance with the principle of highest bandwidth efficiency, according to the above formulae, parameters, namely the multiple N of the loop length to the timeslot length, the length T of the OB packet and the guard interval $T_1$ between the OB packets, can be calculated, so as to achieve that the loop length is an integral multiple of the timeslot length. In an application process, one of the values can be set to a fixed value according to network conditions, and the other two values are obtained by calculation according to the above formulae. For example, under usual conditions, the length T of the OB packet will be selected to be fixed value which is an empirical value, if the Length of the OB packet is too large, it is not convenience to schedule, and if the length of the OB packet is too small, the network utilization rate of the OBTN will be reduced.

Step 102: During the normal operation of the OBTN, a variation of the loop length of the data channel of the OBTN is detected in real time, a value of the variation is compared with a pre-set threshold, and the OB timeslot length is correspondingly processed according to a result of the comparison.

Here, during the normal operation of the OBTN, the variation of the loop length of the data channel of the OBTN is detected in real time, and if it is found that the loop length varies, the master node starts different adjustment solutions according to different lengths $\Delta t_L$ of the variation of the loop length.

A. When the loop length is decreased by $\Delta t_L$, the OB packet will reach the master node in advance after each loop cycle elapses, the reaching time being shorter than ideal time by $\Delta t_L$. In this case, methods for adjusting the OB timeslot length are as follows:

when $\Delta t_L$<a first threshold, the master node does not perform real-time adjustment and sends control frames and data frames in a current manner;

when the first threshold≤$\Delta t_L$<a second threshold, the master node sends a control frame and a data frame $\Delta t_L$ in advance as first frames in each loop cycle and remain an interval between the control frame and the data frame fixed; and sends a last control frame, which is reduced by an idle code having a time length of $\Delta t_L$, in each loop cycle;

when the second threshold≤$\Delta t_L$<a third threshold, the master node decreases a value of T or $T_1$ by $\Delta t_L/N$ and N is remained unchanged to make the loop length equal to an integral multiple of the OB timeslot length, and if the requirement of the integral multiple is not met, time at which the control frames are sent is adjusted in accordance with the previous two methods; and when $\Delta t_L$≥the third threshold, the master node re-calculates at least one of N, T and $T_1$, in order to make the loop length equal to the integral multiple of the OB timeslot length again.

Here, the first threshold, the second threshold and the third threshold can be set after the loop length of the data channel is measured. Specifically, each threshold can be set in accordance with that, for example, the first threshold and the second threshold are each associated with variation time $(0.1+t_p)$us of the guard interval $T_1$ of the OB timeslot length (see the following table 1); the first threshold is generally set to a half of 0.1 us ($t_p$ is 0) namely 50 ns; after $t_p$ is calculated, the second threshold is set to a half of $(0.1+t_p)$us; and the third threshold is generally set to a half or one third of the length of the OB packet, and when the variation of the loop length is greater than the third threshold, it is generally needed to adjust the number N of the OB packets.

B. When the loop length is increased by $\Delta t_L$, the OB packet will reach the master node after each loop cycle elapses, the reaching time being longer than the ideal time by $\Delta t_L$. In this case, methods for adjusting the OB timeslot length are as follows:

when $\Delta t_L$<a first threshold, the master node does not perform real-time adjustment and sends control frames and data frames in a current manner;

when the first threshold≤$\Delta t_L$<a second threshold, the master node sends a control frame and a data frame by delaying for $\Delta t_L$ as first frames in each loop cycle and remain an interval between the control frame and the data frame fixed; and sends a last control frame, which includes an additional idle code having a time length of $\Delta t_L$, in each loop cycle;

when the second threshold≤$\Delta t_L$<a third threshold, the master node increases a value of T or $T_1$ by $\Delta t_L/N$ and N is remained unchanged to make the loop length equal to an integral multiple of the OB timeslot length, and if the requirement of the integral multiple is not met, time at which the control frames are sent is adjusted in accordance with the previous two methods; and when $\Delta t_L$≥the third threshold, the master node re-calculates at least one of N, T and $T_1$, in order to make the loop length equal to the integral multiple of the OB timeslot length again.

The third threshold is associated with the length T of the OB packet and the value N; and by taking a simple example, if the third threshold is a half of the length of the OB packet, the value of variation of the loop length is greater than a half of the length of the OB packet, and the number N of the OB packets in a loop can be increased (or decreased) by 1.

The first threshold, the second threshold and the third threshold can be set after the loop length of the data channel is measured.

Here, in the two cases that the loop length is increased and the loop length is decreased, the first thresholds and the second thresholds can be generally set to identical values; and the third thresholds, in cases that the loop length is increased or the loop length is decreased, may be identical or slightly different. For example, when the loop length is decreased by (1/3)T, N needs to be decreased by 1 accordingly; and when the loop length is increased, N can be added with 1 when the loop length is increased by 0.5 T.

As can be seen, in the embodiment of the disclosure, during the initialization and normal operation of the OBTN, it is needed to detect a loop length of an OBTN loop network in real time. That is, the loop length of the data channel is detected, and a timeslot length of the OBTN loop network is calculated or adjusted according to the detected loop length or a variation of the loop length, so that the loop length is always an integral multiple of the timeslot length to provide a basis for a later synchronization relationship between the data frame and the control frame. Compared with the traditional art, the embodiment of the disclosure solves the problems of complicated control, high insertion loss of optical power, high cost, inconvenient management, insufficient control over accuracy of the loop length and the like caused by the fact that the loop length needs to be set to an integral multiple of the timeslot length by using an FDL in the existing network.

Preferably, Step 101 further includes that: during the initialization of the OBTN, a loop length of a control channel is measured.

The control channel and data channel of the OBTN are independent to each other physically and utilize different wavelengths are used, a continuous optical information packet instead of the OB packet is transmitted in the control channel, and, it is needed to perform photoelectric optical processing and logical judgement for the control channel on each slave node to performs sequential transfer. The theoretic delay of the control channel shall be greater than the delay of the data channel, during measurement of the loop length of the control channel, the master node sends a header of a control frame at certain time $t_3$, and after the control frame are sequentially transferred by respective nodes in a loop network, if the master node receives the header of the control frame at time $t_4$, the loop length of the control channel is $t_4-t_3$. It is not needed to take the delay time of photoelectric optical conversion in each node and the time of logical processing into consideration.

Here, the measurement of the loop length of the control channel is mainly intended to set the time at which the data frame is sent and the time at which the control frame is sent for each node in the OBTN to ensure that, for the data frame and the control frame, packets are synchronously transmitted and received at each node subsequently, thereby ensuring the normal operation of the OBTN. During practical application, it is needed to measure, at first, the loop lengths of the control frame and the data frame, and finally calculate an interval between the time at which the control frame is sent and the time at which the data frame is sent according to the difference value between the two loop lengths as well as the delay for processing the data frame in the nodes.

The method provided by the disclosure is further described below with reference to the specific embodiments.

Figure 2:
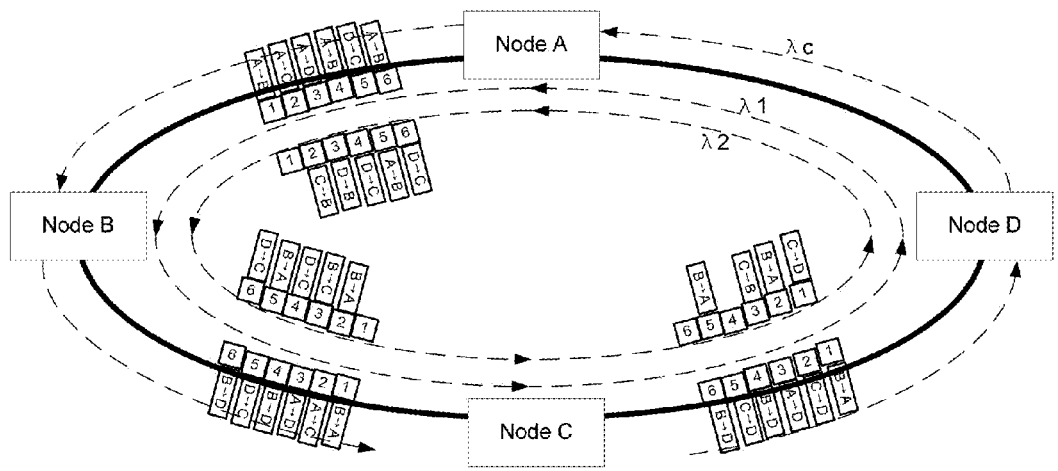
FIG. 2 is a schematic diagram of a basic structure of an OBTN loop network.

FIG. 2 is a schematic diagram of a basic structure of an OBTN loop network details of which are as follows:

1) a network topology is a four-node one-way loop network, a node A is a master node, and other nodes, namely a node B, a node C and a node D, are slave nodes;

2) a data channel of the loop network is configured with two wavelengths λ1 and λ2, a control channel is configured with a wavelength λc, and the rate per wavelength is, for example, 10 Gbps;

3) a loop length of the data channel of the loop network is 3 times as large as the length of a data frame, the data frame contains 10 OB timeslots, that is, the loop length is 30 times as large as the length of OB timeslot, the length of a control frame is equal to that of the data frame, and FIG. 2 only shows 3 OB timeslots 1-6;

4) the control frame is generated by the master node, and each slave node receives the control frame and performs control over transmitting and receiving of the OB packet according to information configured in the control frame, and adds its bandwidth request information into the control frame and regenerates and sends a control frame which will be transmitted along a loop for a circle and ended at the master node; and 5) timeslot synchronization must be kept between the transmitting and receiving of the OB packet in the data channel by all nodes, each node determines whether timeslot synchronization is achieved by detecting a timeslot deviation, wherein the allowed deviation is less than a certain threshold (such as a couple of ns).

Figure 3:
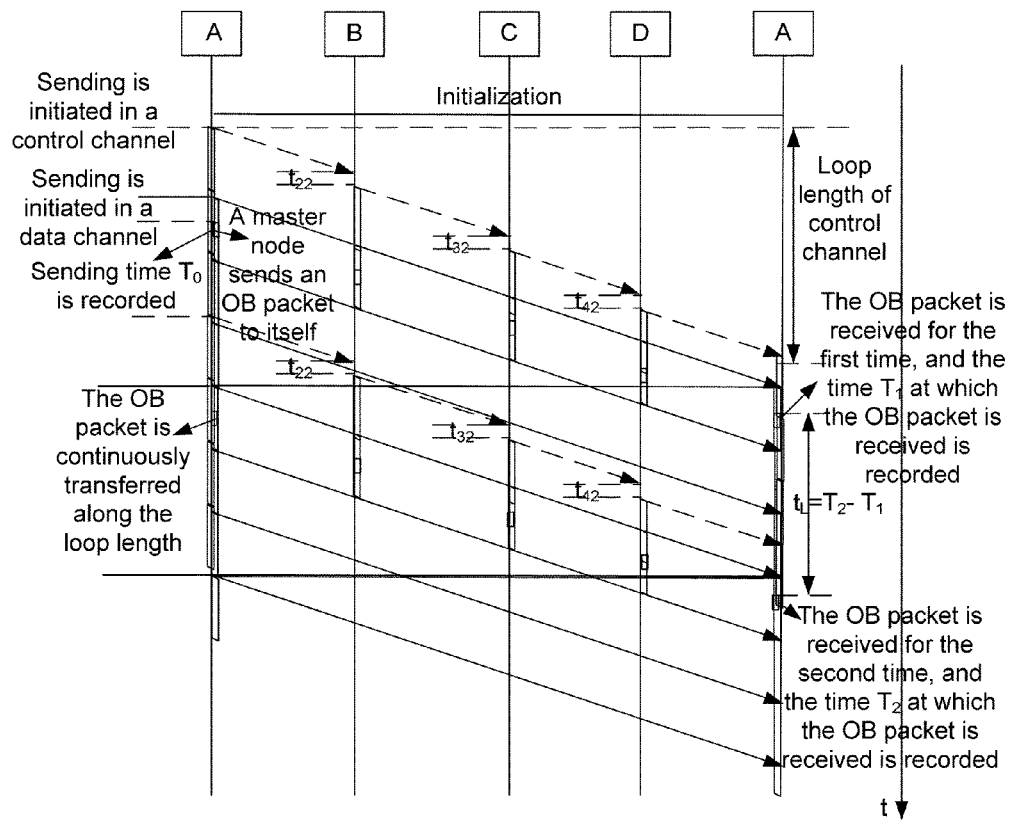
FIG. 3 is a diagram of an embodiment of measuring loop lengths of data channel and control channel of an OBTN.

In order to describe the disclosure in detail, descriptions of embodiments are made with respect to a scenario in FIG. 2. FIG. 3 is a diagram of an embodiment of measuring loop lengths of data channel and control channel of an OBTN. In FIG. 3, transfer of a control channel is represented, for example, by dotted lines, and transfer of a data channel is represented, for example, by solid lines. A specific process is recited as follows.

A loop length of a data frame is measured in the case that the OB packet is sent from a master node A to the master node A for example. During length measurement, the master node A sends an OB packet and waits for receiving the OB packet, in which case it is needed for a control frame to notify each slave node not to use a timeslot on a wavelength of the OB packet in a test process. After the OB packet is transferred in a loop network for a circle, the master node receives the OB packet for the first time, and counts a transfer time length $t_{d1}$ from sending to first-time receiving of the OB packet. However, a certain delay $t_{d2}$ exists in Clock Data Recovery (CDR) and logical processing, the length of a node interior optical fibre for sending and receiving the OB packet of the master node is different from the length of a node data straight-through optical fibre, and the former is larger than the latter by $t_{d3}$, so that true loop length equivalent time satisfies $t_L=t_{d1}-t_{d2}-t_{d3}$. Obviously, if $t_{d2}$ and $t_{d3}$ are not taken into consideration, deviation of the resulting $t_L$ will be relatively large.

In order to accurately measure the loop length of the data channel, in a specific test method, the OB packet sent by the master node A can be transferred for two circles in the loop network, and after the master node A receives the OB packet for successive two times, the influences of $t_{d2}$ and $t_{d3}$ can be eliminated, such that the loop length $t_L$ is calculated more accurately. As shown in FIG. 3, it is described that the master node A sends the OB packet and receives the OB packet. A specific method includes that:

Step 1: the master node A sends an OB packet, and records the time $T_0$ at which the OB packet is sent;

Step 2: the master node A waits for receiving the OB packet, records time $T_1$ at which the OB packet is received for the first time, and allows the OB packet to be continuously transferred in the loop network;

Step 3: the master node A waits for receiving the OB packet, records time $T_2$ at which the OB packet is received for the second time, and ends the OB packet; and Step 4: a loop length $t_L=T_2-T_1$ is calculated.

By means of the calculation, the time length of the OB packet transferred on an entire loop can be obtained, and the delay deviation $t_{d3}$ of a local optical fibre, and the logical processing and electric domain delay time $t_{d2}$ of the master node A can be avoided. By means of the calculation, the accuracy of $t_L$ is associated with a bit rate in the data channel, and the accuracy can reach 0.1 to 0.2 ns which is much less than accuracy of a loop length which can be adjusted by FDL. The transmission delay of a 1 m optical fibre is 5 ns usually, and the length of an FDL optical fibre used in the OBTN generally is within a range of 10 m to 200 m, so the accuracy of a loop length which can be adjusted by FDL is 50 to 1000 ns.

Meanwhile, $t_{d2}+t_{d3}=t_{d1}-t_L=(T_1-T_0)-(T_2-T_1)=2\times T_1-T_0-T_2$, which is delay time of the master node A caused by the own logical and electric domain delay and the optical fibre deviation, can be obtained by calculation, such that data basis is provided for calculating the loop length by directly utilizing $t_{d2}+t_{d3}$ after the loop network normally works. That is, after the loop network normally works, the master node A only needs to subtract $(t_{d2}+t_{d3})$ from time for transferring the OB packet for a circle so as to obtain the length of the current loop network. Of course, after the loop network normally works, the loop length can be accurately calculated by continuously utilizing the manner of transferring the OB packet for two circles.

For the measurement of the loop length of the control channel, the master node A sends a control frame, which is delayed at each slave node for certain time. For example, the control frame is delayed for $t_{22}$ at a node B. The delay is generated because: after optical to electric conversion is performed on the control frame at each slave node, relevant information within the control frame is received, electric optical conversion is performed on the control frame, and then the control frame is sent out, such that a certain delay is generated; and finally, the control frame returns to the master node A. The master node A can obtain the loop length of the control channel by subtracting the time at which the control frame is sent from the time at which the control frame is received.

Figure 4:
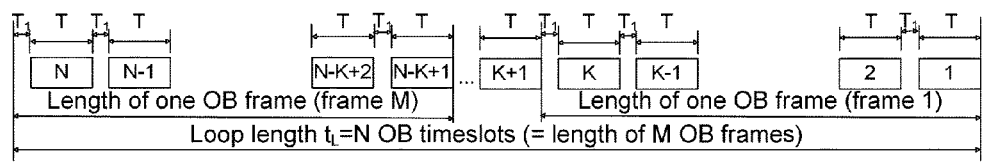
FIG. 4 is a structural diagram of a loop length of an OBTN and an OB timeslot.

FIG. 4 is a structural diagram of a loop length of an OBTN and an OB timeslot. After the accurate loop length $t_L$ of the data channel is obtained, it can be achieved that the loop length is an integral multiple of the timeslot length by calculating the length of the OB timeslot. As shown in FIG. 3, it is assumed that the equivalent time $t_L$ of the loop length contains N OB timeslots, N being a positive integer. And a length of the OB packet (including an overhead and a payload) is T, and a guard interval (including optical switching time and variation time) between the OB packets is $T_1$. In order to facilitate further management of the OB timeslots, N OB timeslots can be equally divided into M OB frames. A plurality of OB timeslots form a frame so as to facilitate network management, since the granularity of each OB timeslot is low generally. For example, 100 OB timeslots can be equally divided into 10 OB frames. As shown in FIG. 4, each frame contains K OB timeslots.

A non-adjustable length of the OB packet is taken as an example. The length of the OB packet is a fixed value 4.3 us, as shown in Table 1, and it can be achieved that the loop length is an integral multiple of the timeslot length by adjusting the number N of OB timeslots in the loop and the guard interval $T_1$. Table 1 is a time composition of the OB timeslots. It is assumed that preamble time for locking power and locking clock is about 0.3 μs, time for OBU overhead and payload is 4 μs, time for optical switching is 0.5 μs, and variation time is $(0.1+t_p)$μs, wherein a fixed value 0.1 μs is contained in the variation time to allow the OB packet to be within a certain deviation range around an ideal position.

TABLE 1

| length (T) of OB packet | | Guard interval ($T_1$) | |
|---|---|---|---|
| preamble (time for recovering power and clock) | OBU overhead and payload | Optical switching time | Variation time |
| 0.3 μs | 4 μs | 0.5 μs | $(0.1 + t_p)$ μs |

In this case, it can be achieved that the loop length is an integral multiple of the OB timeslot by adjusting the number N of OB timeslots in the loop and the variation time $t_p$ which is varied from one OB packet to another OB packet. When $t_p=0$, N, T and $T_1$ can be set by calculation, in order to make $t_L-N\times(T+T_1)$ as least as possible. Thus, the difference is allocated to a number N of $t_p$, so that N and $t_p$ can be obtained. The calculation formulae are as follows:

$t_L=(T+T_1)\times N$, referring to the requirement of the integral multiple $t_p\times N\times M$ being as least as possible, referring to that the bandwidth efficiency is as high as possible T=4.3, referring to that the length of the OB packet is a fixed value $T_1\times N$ being as least as possible, referring to that the bandwidth efficiency is as high as possible $t_p\geq 0$, referring to that the guard interval $T_1$ must be greater than or equal to a minimum value 0.6 μs of the guard interval.

According to a principle of highest bandwidth efficiency, N and $t_p$ can be selected so that the OB timeslot length can be determined. $t_p\times N\times M$ being as least as possible represents that the sum of $t_p$ between all OB packets on a network occupies least-possible time on the loop length, so that most periods of time on the loop are spent for transmitting payload, and the utilization rate of the bandwidth will be increased.

For example, when T=0.3+4=4.3 μs and $T_1=0.5+0.1+t_p=0.6+t_p$ μs, $T+T_1=4.9+t_p$ μs, if the loop length L=20 km or $t_L=100$ μs, it can be calculated that N=20 and $t_p=0.1$ μs.

Table 2 illustrates the calculation of an OB timeslot length.

TABLE 2

| Loop length | Calculated number of timeslots and timeslot length (T + $T_1$ = 4.9 + $t_p$ μs) | |
|---|---|---|
| L, $t_L$ | N | $t_p$ |
| 20 km, 100 μs | 20 | 0.1 μs |
| 50 km, 250 μs | 51 | 0.002 μs |
| 50 km, 250 μs | 50 | 0.1 μs |

From Table 2, it can be seen that when the loop length is 50 km, in order to make the bandwidth efficiency highest, that is, in order to satisfy $t_1\times N$ being as least as possible, a result of the calculation is N=51, that is, 51 OB timeslots exist in the loop. However, if N is 50, the length of the guard interval will be increased by about 0.1 μs, which may cause waste on bandwidth.

Figure 5:
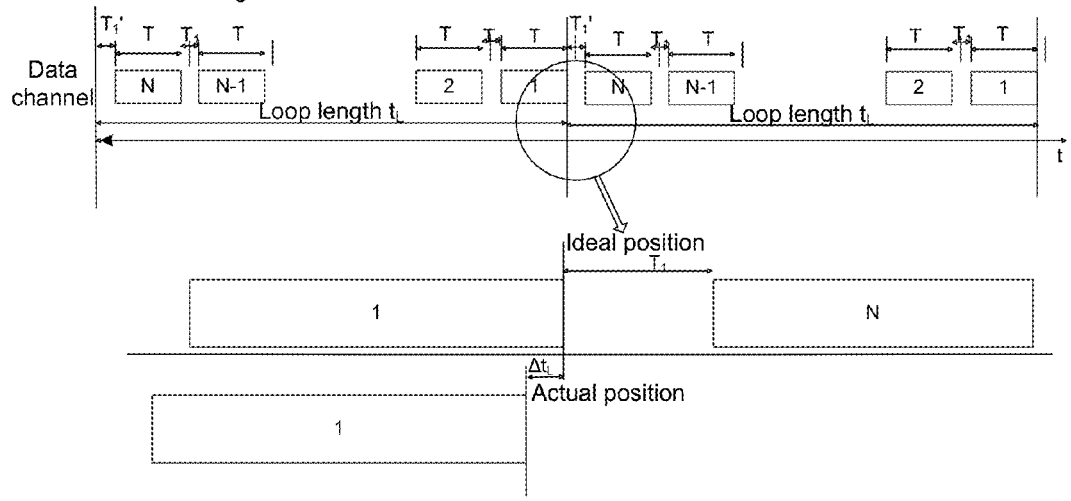
FIG. 5 is a diagram of an example of a deviation, which is caused by a variation of the loop length of an OBTN, of time at which an OB packet reaches a master node.

FIG. 5 is a diagram of an example of a deviation of time at which an OB packet reaches a master node caused by a variation of the loop length of an OBTN. By means of loop length testing, loop length resulting from the test is $t_L$, it is determined that N OB timeslots exist in the loop by means of calculation in which the loop length is an integral multiple of the timeslot length, wherein a guard interval between every two OB timeslots is a fixed value $T_1$. If the loop length does not vary, whenever the master node sends an OB timeslot, it is found by the master node that the guard interval between an OB timeslot returned in a previous loop cycle and the OB timeslot to be sent at this time is still $T_1$. However, if the loop length varies, when the master node sends the OB timeslot, it is found by the master node that the guard interval between the OB timeslot returned in the previous loop cycle and the OB timeslot to be sent at this time is not $T_1$, and there is a variation $\Delta t_L$ in the guard interval. As shown in FIG. 5, it is found by the master node that the guard interval between the OB timeslot returned in the previous loop cycle and the OB timeslot to be sent at this time is $T_1+\Delta t_L$, that is, the loop length is increased by $\Delta t_L$. In this case, it is needed to perform corresponding processing according to the size of $\Delta t_L$, in order that a sufficient guard interval exists between the OB packets, and the OB packet sent at this time will not collide with the OB packet in the previous loop cycle.

In a normal working process, if it is detected that the loop length varies, the master node utilizes different methods according to different lengths $\Delta t_L$ of the variation of the loop length. As shown in FIG. 5, an OB position at which the master node receives the OB timeslot deviates from an ideal position. If the OB position is behind the ideal position by $\Delta t_L$, it is shown that the loop length is increased by $\Delta t_L$. If the OB position is ahead of the ideal position by $\Delta t_L$, it is shown that the loop length is decreased by $\Delta t_L$. In an example of Table 1, the length of the OB packet is fixed, so that the number N of OB timeslots in the loop and the time $t_p$ in the variation time of the guard interval can be adjusted. In this case, adjustment methods are recited as follows:

(1) When the loop length is decreased by $\Delta t_L$, the OB packet will reach the master node $\Delta t_L$ in advance after each loop cycle, accordingly, when $\Delta t_L<$a first threshold, the master node does not perform real-time adjustment and sends control frames and data frames in a current manner; in the example of Table 1, the first threshold can be 50 ns, the variation time in the guard interval in the OB timeslot is $(0.1+t_p)$μs, and the OB packet will not be transmitted for over two circles in the loop network, so that the problem of deviation accumulation can be avoided, and in each loop cycle, it will be found that the OB packet reaches the master node $\Delta t_L$ in advance;

when the first threshold$\leq\Delta t_L<$a second threshold, the master node sends a control frame and a data frame $\Delta t_L$ in advance as first frames in each loop cycle and remains a fixed interval between the control frame and the data frame; the master node sends a last control frame, which is reduced by an idle code having a time length of $\Delta t_L$ in each loop cycle; in this case, a manner of advancing the time of the data frame without changing the time at which the control frame is sent cannot be adopted, since this may probably cause that the time at which the control frame is received by the last node is insufficiently ahead of the time at which the data frame is received; in the instance of Table 1, the first threshold can be 50 ns, and the second threshold can be $(t_p+0.1)/2$ μs;

when the second threshold≤$\Delta t_L$<a third threshold, the master node decreases a value $t_p$ by $\Delta t_L/N$ and N is remained unchanged to make the loop length equal to an integral multiple of the timeslot length as far as possible, and if the requirement of the integral multiple is not met, the time at which the control frames are sent is adjusted in accordance with the previous two methods; in the instance of Table 1, the second threshold can be $(t_p+0.1)/2$ μs, and the third threshold is $0.1/2+t_p\times N$ μs; and when $\Delta t_L$≥the third threshold, the master node re-calculates values of N and $t_p$, in order to make the loop length equal to the integral multiple of the timeslot, and in the instance of Table 1, the third threshold can be $0.1/2+t_p\times N$ μs.

(2) When the loop length is increased by $\Delta t_L$, the OB packet will reach the master node by delaying for $\Delta t_L$ after each loop cycle.

When $\Delta t_L$<a first threshold, the master node does not perform real-time adjustment and sends control frames and data frames in a current manner; in the instance of Table 1, the first threshold can be 50 ns, and since the OB packet will not be transmitted for many circles in the loop network, deviation accumulation can be avoided, and in each loop cycle, it will be found that the OB packet reaches the master node by delaying for $\Delta t_L$;

when the first threshold≤$\Delta t_L$<a second threshold, the master node sends a control frame and a data frame by delaying for $\Delta t_L$ as first frames in each loop cycle and remain a fixed interval between the control frame and the data frame; the master node sends a last control frame, which includes an additional idle code having a time length of $\Delta t_L$, in each loop cycle; in this case, alternatively, the time at which the data frame is delayed for $\Delta t_L$ without changing the time at which the control frame is sent, and meanwhile, each slave node is informed of $\Delta t_L$ via a control channel, such that each slave node adjusts a fixed deviation value between the control frame and the data frame; however, it will be found that the data frame will be sent by delaying for $\Delta t_L$ in each loop cycle, which will cause that the deviation between the data frame and the control frame is increasing, so that the previous method is preferred; in the instance of Table 1, the first threshold can be 50 ns, and the second threshold is $(t_p+0.1)/2$ μs;

when the second threshold≤$\Delta t_L$<a third threshold, the master node increases a value of $t_p$ by $\Delta t_L/N$ and N is remained unchanged to make the loop length equal to an integral multiple of the timeslot length, and in the instance of Table 1, the second threshold can be $(t_p+0.1)/2$ μs; and when $\Delta t_L$≥the third threshold, the master node re-calculates values of N and $t_p$, and makes the loop length equal to the integral multiple of the timeslot length. Here, the third threshold is associated with the length of the OB packet and the value of N; and by taking a simple example, if the third threshold is a half of the length of the OB packet, when the variation of the loop length value is greater than a half of the length of the OB packet, the number N of the OB packets in the loop can be increased (or decreased) by 1. In the instance of Table 1, the third threshold can be a time length in which N can be changed.

As can be seen, by detecting the variation of the loop length and controlling the control frame, the data frame and the timeslot length, it can be ensured, in the case that the loop length varies, that the loop length is still an integral multiple of the OB timeslot length, and each node can normally transmit and receive the OB packet. If the length of the OB packet is variable, the length of the OB packet, $t_p$ in the variation time and the number of OB timeslots in the loop can be adjusted.

Figure 6:
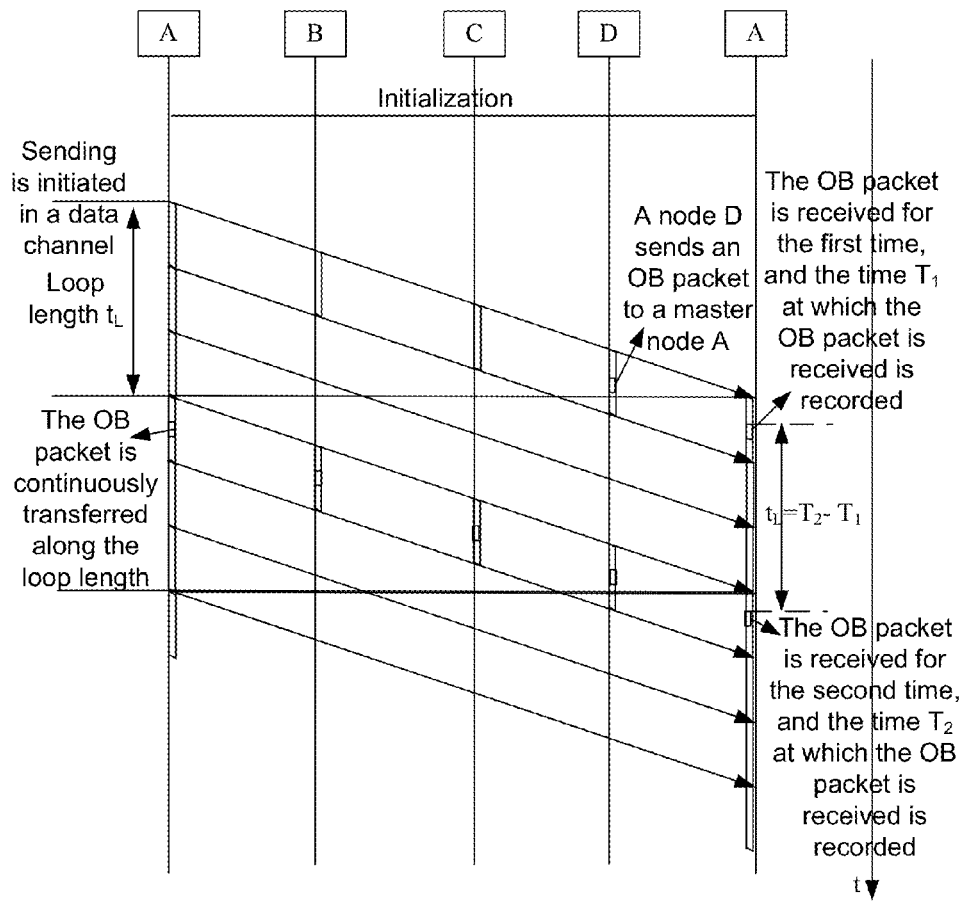
FIG. 6 is a diagram of another example of measuring loop length of data channel of an OBTN.

FIG. 6 is a diagram of another example of measuring loop length of data channel of an OBTN. Only example of measuring loop length of the data channel is described in FIG. 6, details of which are as follows.

In the example, the loop length of the data channel is measured by sending an OB packet from a slave node D to the master node A. During length measurement, the slave node D sends an OB packet, the master node A is always in a receiving awaiting state, in which case, a control frame is needed to notify, in a test process that the slave node D sends a test packet and that other slave nodes are not allowed to use the timeslot on a wavelength of the OB packet. After the OB packet is transferred in a loop network, the master node can receive the OB packet.

In order to accurately measure the loop length of the data channel, $t_{d2}$ (due to the fact that each of CDR and logical processing has a certain delay) and $t_{d3}$ (due to the fact that the lengths of a transmitting/receiving optical fibre and a straight-through optical fibre are different from each other) within the master node A are eliminated, and a specific test method includes that: the OB packet sent by the slave node D can be transferred in the loop network for two circles, and after the master node A receives the OB packet for successive two times, the influences of $t_{d2}$ and $t_{d3}$ can be eliminated, such that the loop length $t_L$ is calculated more accurately. As shown in FIG. 6, it is described that the slave node D sends the OB packet and the master node A receives the OB packet. A specific method is recited as follows:

Step 1: the slave node D sends an OB packet;

Step 2: the master node A waits for receiving the OB packet, records time $T_1$ at which the OB packet is received for the first time, and allows the OB packet to be continuously transferred in the loop network;

Step 3: the master node A waits for receiving the OB packet, records time $T_2$ at which the OB packet is received for the second time, and ends the OB packet; and Step 4: a loop length $t_L=T_2-T_1$ is calculated.

By means of the calculation, the time length for the OB packet to be transferred on an entire loop can be obtained, and the delay deviation $t_{d3}$ of a local optical fibre and the logical processing and electric domain delay time $t_{d2}$ of the master node A can be avoided. By means of the calculation, the accuracy of the obtained $t_L$ is associated with a bit rate of the data channel, and the accuracy is relatively high, and is much less than the accuracy of a loop length which can be adjusted by FDL in the traditional technique.

The loop length of the control channel can be tested as shown in the example of FIG. 3.

On the basis of the above method, the loop length of the OBTN can be accurately tested, and it is achieved that the loop length of the data channel is an integral multiple of the timeslot length, thereby solving the problems of complicated control, high insertion loss of optical power, high cost, inconvenient management, insufficient control over accuracy of the loop length and the like caused by the fact that the loop length needs to be set to an integral multiple of the timeslot length by using an FDL in the existing network.

Figure 7:
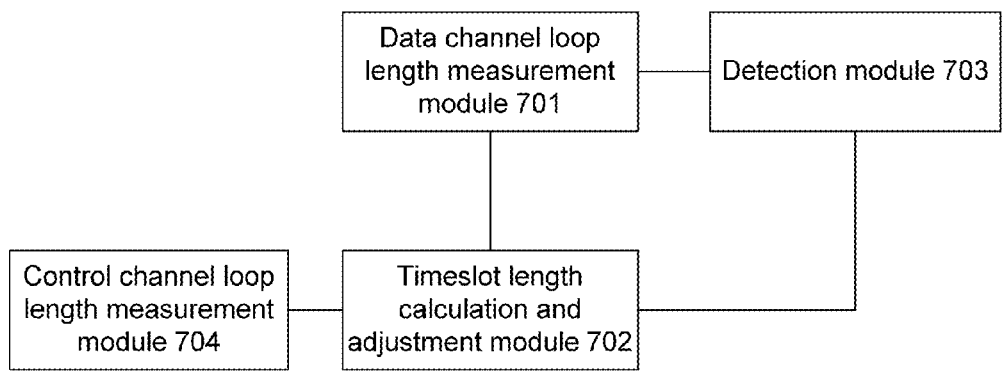
FIG. 7 is a diagram of a result of an apparatus for adjusting a timeslot length of an OBTN according to an embodiment of the disclosure.

According to an embodiment of the disclosure, there is provided an apparatus for adjusting a timeslot length of an OBTN, as shown in FIG. 7, which includes: a data channel loop length measurement module 701, a timeslot length calculation and adjustment module 702 and a detection module 703.

The data channel loop length measurement module 701 may be configured to measure a loop length of a data channel during the initialization and normal operation of an OBTN.

The timeslot length calculation and adjustment module 702 may be configured to calculate, during the initialization of the OBTN, an OB timeslot length according to the loop length measured by the data channel loop length measurement module 701, and correspondingly process, during the normal operation of the OBTN, the OB timeslot length according to a result of a comparison of the detection module 703

The detection module 703 is configured to detect in real time, during the normal operation of the OBTN, a variation of the loop length measured by the data channel loop length measurement module 701 and compare a value of the variation with a pre-set threshold.

Preferably, the apparatus may further include a control channel loop length measurement module 704 which configured to measure, during the initialization of the OBTN, a loop length of a control channel.

Figure 8:
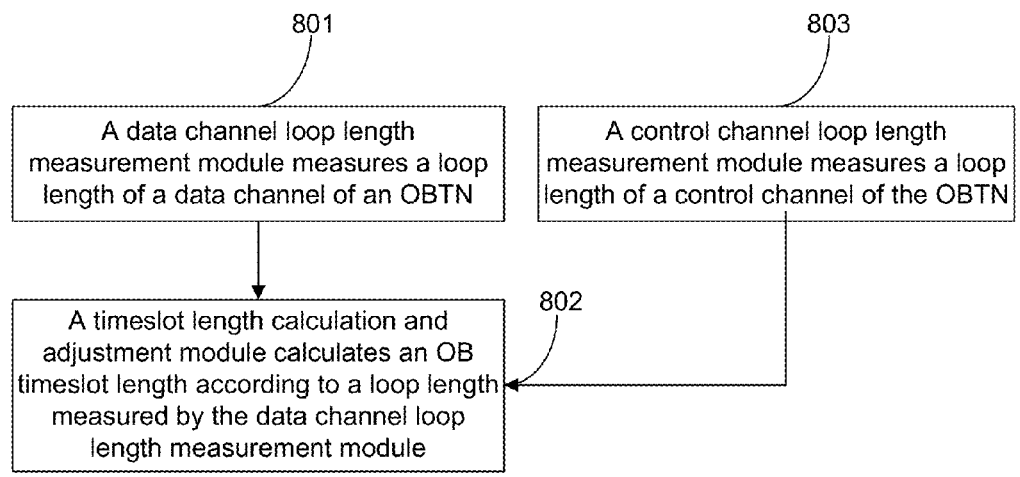
FIG. 8 is a flowchart of an embodiment of implementing the method of the disclosure by the apparatus of the disclosure during the initialization of an OBTN.

FIG. 8 is a flowchart of an embodiment of implementing the method of the disclosure by the apparatus of the disclosure during the initialization of an OBTN. The apparatus includes: a data channel loop length measurement module and a timeslot length calculation and adjustment module, and further includes a control channel loop length measurement module. It should be noted that the apparatus provided by the disclosure is preferably arranged on a master node. Details are recited as follows.

Step 801: The data channel loop length measurement module measures a loop length of a data channel of an OBTN, and a result of the measurement can be sent to the timeslot length calculation and adjustment module or can be retrieved by the timeslot length calculation and adjustment module.

An OB packet is transmitted via the data channel of the OBTN. In order to achieve measurement of the loop length of the data channel of the OBTN loop network, it is needed for a master node to count transfer time, excluding delay time of uplink and downlink optical fibres and a logical circuit within each node, of the OB packet in the data channel by sending and receiving the OB packet. The data channel loop length measurement module measures the loop length of the data channel in the following manner that: a certain node (such as the master node or a slave node) is allowed to send the OB packet to the master node, and the master node receives the OB packet at successive two times. If time at which the OB packet reaches the master node for the first time and time at which the OB packet reaches the master node for the second time are $t_1$ and $t_2$ respectively, the measured loop length is $t_L = t_2 - t_1$.

Step 802: The timeslot length calculation and adjustment module calculates an OB timeslot length according to the loop length measured by the data channel loop length measurement module, so that the loop length of the OBTN is an integral multiple of the OB timeslot length.

Furthermore, the flow further includes that Step 803: the control channel loop length measurement module measures a loop length of a control channel of the OBTN, and can send a result of the measurement to the timeslot length calculation and adjustment module.

The control channel and data channel of the OBTN are independent to each other physically and utilize different wavelengths, successive optical information packets instead of the OB packets are transmitted in the control channel, and for the control channel, it is needed to perform optical to electric to optical processing and logical judgement on each slave node to perform sequential transfer. Theoretically, the delay of the control channel shall be greater than the delay of the data channel. During the measurement of the loop length of the control channel, the control channel loop length measurement module allows the master node to send a header of a control frame at certain time $t_3$, and after the control frame are sequentially transferred by respective nodes in a loop network, the master node receives the header of the control frame at time $t_4$, and thus the loop length of the control channel is $t_4 - t_3$. It is not needed to take the delay time of optical to electric to optical conversion and the time of logical processing in each node into consideration. The control channel loop length measurement is mainly intended to set, in each node in the OBTN, the time at which the data frame will be sent and time at which the control frame will be sent to ensure that, for the data frame and the control frame, packets are synchronously transmitted and received at each node subsequently, thereby ensuring the normal operation of the OBTN.

Figure 9:
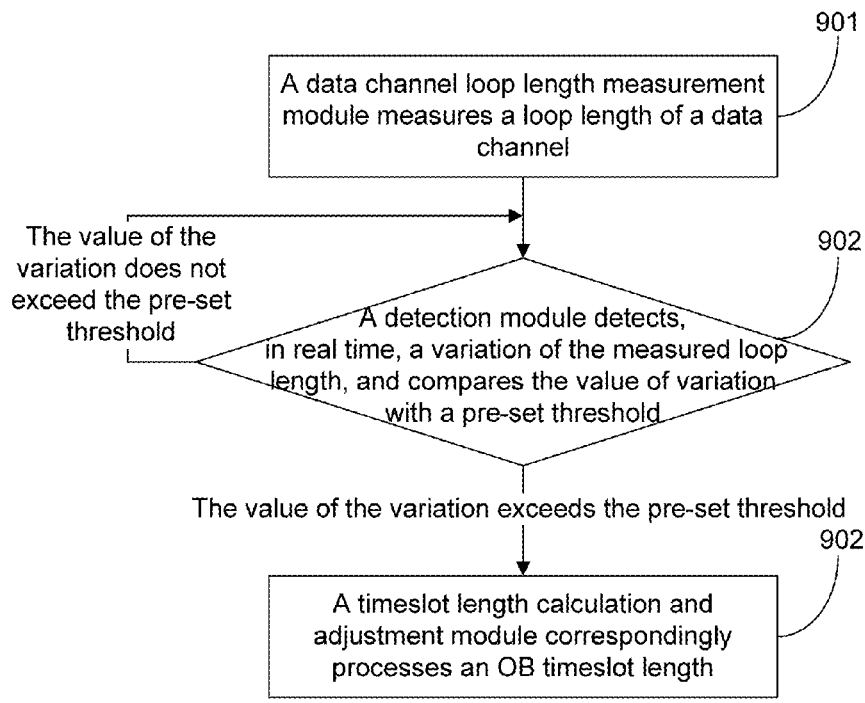
FIG. 9 is a flowchart of an embodiment of implementing the method of the disclosure by the apparatus of the disclosure during the normal operation of an OBTN.

FIG. 9 is a flowchart of an embodiment of implementing the method of the disclosure by the apparatus of the disclosure during the normal operation of an OBTN. The apparatus includes a data channel loop length measurement module and a timeslot length calculation and adjustment module, as well as a detection module. It should be noted that the apparatus provided by the disclosure is preferably arranged on a master node. Details are recited as follows.

Step 901: The data channel loop length measurement module measures a loop length of a data channel, and a result of the measurement can be sent to the detection module or can be retrieved by the detection module.

Step 902: The detection module detects, in real time, a variation of the loop length measured by the data channel loop length measurement module during network operation, and compares a value of the variation with a pre-set threshold. If the value of the variation exceeds the pre-set threshold, a timeslot length calculation and adjustment module is invoked to correspondingly process an OB timeslot length according to the adjustment methods as mentioned above which will be not described in detail here, thereby ensuring that the loop length is always an integral multiple of the timeslot length, which provides a basis for a later synchronization relationship between the data frame and the control frame; and if the value of the variation does not exceed the pre-set threshold, the detection operation is continuously executed.

An embodiment of the disclosure also provides a node, which is located in an OBTN and includes the above OBTN loop length detection module, and timeslot length calculation and adjustment module.

An embodiment of the disclosure also provides a computer storage medium. Computer executable instructions are stored in the computer storage medium, for executing the method according to any one of the method embodiments.

According to the embodiments of the disclosure, during the initialization and normal operation of the OBTN, it is needed to detect the loop length of the OBTN loop network in real time. That is, the loop length of the data channel is detected, and the timeslot length of the OBTN loop network is calculated or adjusted according to the detected loop length or the variation of the detected loop length, so that the loop length is always an integral multiple of the timeslot length, which provides a basis for a later synchronization relationship between the data frame and the control frame. Compared with the traditional art, the embodiments of the disclosure solve the problems of complicated control, high insertion loss of optical power, high cost, inconvenient management, insufficient control over accuracy of the loop length and the like caused by the fact that the loop length needs to be set to an integral multiple of the timeslot length by using an FDL in the existing network.

All the units can be implemented by a Central Processing Unit (CPU), a Digital Signal Processor (DSP) or a Field-Programmable Gate Array (FPGA) in an electronic device.

Those skilled in the art shall understand that the embodiments of the disclosure may be provided as a method, a system or a computer program product. Thus, forms of hardware embodiments, software embodiments or embodiments integrating software and hardware may be adopted in the disclosure. Moreover, a form of computer program product implemented on one or more computer available storage media (including, but not limited to, a disk memory, an optical memory and the like) containing computer available program codes may be adopted in the disclosure.

The disclosure is described with reference to flowcharts and/or block diagrams of the method, the device (system) and the computer program product according to the embodiments of the disclosure. It shall be understood that each flow and/or block in the flowcharts and/or the block diagrams and a combination of the flows and/or the blocks in the flowcharts and/or the block diagrams may be implemented by computer program instructions. These computer program instructions may be provided for a general purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the processors of the computers or the other programmable data processing devices.

These computer program instructions may also be stored in a computer readable memory capable of guiding the computers or the other programmable data processing devices to work in a specific manner, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded onto the computers or the other programmable data processing devices, so that processing implemented by the computers is generated by executing a series of operation steps on the computers or the other programmable devices, and therefore the instructions executed on the computers or the other programmable devices provide steps of achieving the functions designated in one or more flows of the flowcharts and/or one or more blocks of the block diagrams.

The above is only the preferred embodiments of the disclosure, and is not intended to limit the protective scope of the disclosure.

What is claimed is:

1. A method for adjusting a timeslot length of an Optical Burst Transport Network (OBTN), comprising:

measuring, during initialization of the OBTN, a loop length of a data channel, and calculating an Optical Burst (OB) timeslot length according to a result of the measurement; and detecting, during the normal operation of the OBTN, a variation of the loop length of the data channel of the OBTN in real time, comparing a value of the variation with a pre-set threshold and correspondingly controlling a control frame, a data frame and the OB timeslot length according to a result of the comparison and maintaining a synchronization relationship between the data frame and the control frame in a case that the loop length varies.

2. The method according to claim 1, wherein the step of measuring a loop length of a data channel comprises:

sending, by a node, an OB packet to a master node;

receiving, by the master node, the OB packet at two successive times $t_1$ and $t_2$, respectively; and obtaining the loop length according to a time interval $t_L = t_2 - t_1$.

3. The method according to claim 1, wherein the OB timeslot length is calculated according to the result of the measurement of the loop length by means of the following formulae:

$$t_L = (T+T_1) \times N, \ T \leq T_{max}, \text{ and } T_1 \geq T_{1min},$$

where $t_L$ represents the loop length of the data channel, T represents the length of the OB packet, $T_1$ represents a guard interval between the OB packets, $T+T_1$ represents the OB timeslot length, and N is a positive integer and represents that $t_L$ is a multiple of the OB timeslot length; $T_{max}$ represents a maximum value of the length of the OB packet; and $T_{1min}$ represents a minimum value of the guard interval between the OB packets.

4. The method according to claim 3, wherein the step of comparing a value of the variation with a pre-set threshold and correspondingly controlling a control frame, a data frame and the OB timeslot length according to a result of the comparison and maintaining a synchronization relationship between the data frame and the control frame in a case that the loop length varies comprises:

when the loop length of the data channel is decreased by $\Delta t_L$, adjusting the OB timeslot length according to methods in which:

when $\Delta t_L <$ a first threshold, sending, by the master node, control frames and data frames in a current manner;

when the first threshold $\leq \Delta t_L <$ a second threshold, sending, by the master node, as first frames, a control frame and a data frame $\Delta t_L$ in advance in each loop cycle, and sending a last control frame, which is reduced by an idle code having a time length of $\Delta t_L$, in each loop cycle;

when the second threshold $\leq \Delta t_L <$ third threshold, decreasing, by the master node, a value of T or $T_1$ by $\Delta t_L/N$ and remaining N unchanged to make the loop length equal to an integral multiple of the OB timeslot length, and if the requirement of the integral multiple is not met, adjusting a time at which the control frames are sent in accordance with the previous two methods; and when $\Delta t_L \geq$ the third threshold, re-calculating, by the master node, a least one of N, T and $T_1$, in order to make the loop length equal to the integral multiple of the OB timeslot length again.

5. The method according to claim 3, wherein the step of comparing a value of the variation with a pre-set threshold and correspondingly controlling a control frame, a data frame and the OB timeslot length according to a result of the comparison and maintaining a synchronization relationship between the data frame and the control frame in a case that the loop length varies comprises:

when the loop length of the data channel is increased by $\Delta t_L$, adjusting the OB timeslot length according to methods in which:

when $\Delta t_L$<a first threshold, sending, by the master node, control frames and data frames in a current manner;

when the first threshold≤$\Delta t_L$<a second threshold, sending, by the master node, as first frames; a control frame and a data frame by delaying for $\Delta t_L$ in each loop cycle, and sending a last control frame, which comprises an additional idle code having a time length of $\Delta t_L$, in each loop cycle;

when the second threshold≤$\Delta t_L$<a third threshold, increasing, by the master node, a value of T or $T_1$ by $\Delta t_L/N$ and remaining N unchanged to make the loop length equal to an integral multiple of the OB timeslot length, and if the requirement of the integral multiple is not met; adjusting a time at which the control frames are sent in accordance with the previous two methods; and when $\Delta t_L$≥the third threshold, re-calculating, by the master node, at least one of N, T and $T_1$, in order to make the loop length equal to the integral multiple of the OB timeslot length again.

6. The method according to claim 1, further comprising:
a step of measuring, during the initialization of the OBTN, a loop length of a control channel, which comprises:
sending, by the master node, a header of a control frame at time $t_3$, and after the control frame are sequentially transferred by respective nodes in a loop network, receiving, by the master node; the header of the control frame at time $t_4$, the loop length of the control channel being $t_4-t_3$.

7. The method according to claim 2, wherein the OB timeslot length is calculated according to the result of the measurement of the loop length by means of the following formulae:

$$t_L=(T+T_1)\times N,\ T\le T_{max},\ \text{and}\ T_1\ge T_{1min},$$

where $t_L$ represents the loop length of the data channel, T represents the length of the OB packet, $T_1$ represents a guard interval between the OB packets, $T+T_1$ represents the OB timeslot length, and N is a positive integer and represents that $t_L$ is a multiple of the OB timeslot length; $T_{max}$ represents a maximum value of the length of the OB packet; and $T_{1min}$ represents a minimum value of the guard interval between the OB packets.

8. The method according to claim 7, wherein the step of comparing a value of the variation with a pre-set threshold and correspondingly controlling a control frame, a data frame and the OB timeslot length according to a result of the comparison and maintaining a synchronization relationship between the data frame and the control frame in a case that the loop length varies comprises:

when the loop length of the data channel is decreased by $\Delta t_L$, adjusting the OB timeslot length according to methods in which:

when $\Delta t_L$<a first threshold, sending, by the master node, control frames and data frames in a current manner;

when the first threshold≤$\Delta t_L$<a second threshold, sending, by the master node, as first frames, a control frame and a data frame $\Delta t_L$ in advance in each loop cycle, and sending a last control frame, which is reduced by an idle code having a time length of $\Delta t_L$, in each loop cycle;

when the second threshold≤$\Delta t_L$<third threshold, decreasing, by the master node, a value of T or $T_1$ by $\Delta t_L/N$ and remaining N unchanged to make the loop length equal to an integral multiple of the OB timeslot length, and if the requirement of the integral multiple is not met, adjusting a time at which the control frames are sent in accordance with the previous two methods; and when $\Delta t_L$≥the third threshold, re-calculating, by the master node, at least one of N, T and $T_1$, in order to make the loop length equal to the integral multiple of the OB timeslot length again.

9. The method according to claim 7, wherein the step of comparing a value of the variation with a pre-set threshold and correspondingly controlling a control frame, a data frame and the OB timeslot length according to a result of the comparison and maintaining a synchronization relationship between the data frame and the control frame in a case that the loop length varies comprises:

when the loop length of the data channel is increased by $\Delta t_L$, adjusting the OB timeslot length according to methods in which;

when $\Delta t_L$<a first threshold, sending, by the master node, control frames and data frames in a current manner;

when the first threshold≤$\Delta t_L$<a second threshold, sending, by the master node, as first frames, a control frame and a data frame by delaying for $\Delta t_L$ in each loop cycle, and sending a last control frame, which comprises an additional idle code having a time length of $\Delta t_L$, in each loop cycle;

when the second threshold≤$\Delta t_L$<a third threshold, increasing, by the master node, a value of T or $T_1$ by $\Delta t_L/N$ and remaining N unchanged to make the loop length equal to an integral multiple of the OB timeslot length, and if the requirement of the integral multiple is not met, adjusting a time at which the control frames are sent in accordance with the previous two methods; and when $\Delta t_L$≥the third threshold, re-calculating, by the master node, at least one of N, T and $T_1$, in order to make the loop length equal to the integral multiple of the OB timeslot length again.

10. An apparatus for adjusting a timeslot length of an Optical Burst Transport Network (OBTN), comprising:
a memory storing processor-executable instructions; and
a processor arranged to execute the stored processor-executable instructions to perform steps of:
measuring, during the initialization and normal operation of an OBTN, a loop length of a data channel, and calculating an Optical Burst (OB) timeslot length according to a result of the measurement; and
detecting, during the normal operation of the OBTN, a variation of the loop length of the data channel of the OBTN in real time, comparing a value of the variation with a pre-set threshold and correspondingly controlling a control frame, a data frame and the OB timeslot length according to a result of the comparison and maintaining a synchronization relationship between the data frame and the control frame in a case that the loop length varies.

11. The apparatus according to claim 10, wherein the processor is arranged to execute the stored processor-executable instructions to further perform a step of:
measuring, during the initialization of the OBTN, a loop length of a control channel, which comprises:
sending, by the master node, a header of a control frame at time $t_3$, and after the control frame are sequentially transferred by respective nodes in a loop network, receiving, by the master node, the header of the control frame at time $t_4$, the loop length of the control channel being $t_4-t_3$.

12. A node which is located in an Optical Burst Transport Network (OBTN) and comprises the apparatus for adjusting a timeslot length of an Optical Burst Transport Network (OBTN), the apparatus comprising:

a memory storing processor-executable instructions; and a processor arranged to execute the stored processor-executable instructions to perform steps of:

measuring, during the initialization and normal operation of an OBTN, a loop length of a data channel, and calculating an Optical Burst (OB) timeslot length according to a result of the measurement; and detecting, during the normal operation of the OBTN, a variation of the loop length of the data channel of the OBTN in real time, comparing a value of the variation with a pre-set threshold and correspondingly controlling a control frame, a data frame and the OB timeslot length according to a result of the comparison and maintaining a synchronization relationship between the data frame and the control frame in a case that the loop length varies.

13. The node according to claim 12, wherein the processor is arranged to execute the stored processor-executable instructions to further perform a step of:

measuring, during the initialization of the OBTN, a loop length of a control channel, which comprises:

sending, by the master node, a header of a control frame at time $t_3$, and after the control frame are sequentially transferred by respective nodes in a loop network, receiving, by the master node, the header of the control frame at time $t_4$, the loop length of the control channel being $t_4-t_3$.

14. A non-transitory computer storage medium storing therein computer executable instructions for executing a method for adjusting a timeslot length of an Optical Burst Transport Network (OBTN), the method comprising the steps of:

measuring, during initialization of the OBTN, a loop length of a data channel, and calculating an Optical Burst (OB) timeslot length according to a result of the measurement; and detecting, during the normal operation of the OBTN, a variation of the loop length of the data channel of the OBTN in real time, comparing a value of the variation with a pre-set threshold and correspondingly controlling a control frame, a data frame and the OB timeslot length according to a result of the comparison and maintaining a synchronization relationship between the data frame and the control frame in a case that the loop length varies.

15. The non-transitory computer storage medium according to claim 14, wherein the step of measuring a loop length of a data channel comprises:

sending, by a node, an OB packet to a master node;

receiving, by the master node, the OB packet at two successive times $t_1$ and $t_2$, respectively; and obtaining the loop length according to a time interval $t_L=t_2-t_1$.

16. The non-transitory computer storage medium according to claim 14, wherein the OB timeslot length is calculated according to the result of the measurement of the loop length by means of the following formulae:

$$t_L=(T+T_1)\times N,\ T\leq T_{max},\ \text{and}\ T_1\geq T_{1min},$$

where $t_L$ represents the loop length of the data channel, T represents the length of the OB packet, $T_1$ represents a guard interval between the OB packets, $T+T_1$ represents the OB timeslot length, and N is a positive integer and represents that $t_L$ is a multiple of the OB timeslot length; $T_{max}$ represents a maximum value of the length of the OB packet; and $T_{1min}$ represents a minimum value of the guard interval between the OB packets.

17. The non-transitory computer storage medium according to claim 16, wherein the step of comparing a value of the variation with a pre-set threshold and correspondingly controlling a control frame, a data frame and the OB timeslot length according to a result of the comparison and maintaining a synchronization relationship between the data frame and the control frame in a case that the loop length varies comprises:

when the loop length of the data channel is decreased by $\Delta t_L$, adjusting the OB timeslot length according to methods in which:

when $\Delta t_L<$a first threshold, sending, by the master node, control frames and data frames in a current manner;

when the first threshold$\leq\Delta t_L<$a second threshold, sending; by the master node, as first frames, a control frame and a data frame $\Delta t_L$ in advance in each loop cycle, and sending a last control frame, which is reduced by an idle code having a time length of $\Delta t_L$, in each loop cycle;

when the second threshold$\leq\Delta t_L<$third threshold, decreasing, by the master node, a value of T or $T_1$ by $\Delta t_L/N$ and remaining N unchanged to make the loop length equal to an integral multiple of the OB timeslot length, and if the requirement of the integral multiple is not met, adjusting a time at which the control frames are sent in accordance with the previous two methods; and when $\Delta t_L\geq$the third threshold, re-calculating, by the master node, at least one of N, T and $T_1$, in order to make the loop length equal to the integral multiple of the OB timeslot length again.

18. The non-transitory computer storage medium according to claim 16, wherein the step of comparing a value of the variation with a pre-set threshold and correspondingly controlling a control frame, a data frame and the OB timeslot length according to a result of the comparison and maintaining a synchronization relationship between the data frame and the control frame in a case that the loop length varies comprises:

when the loop length of the data channel is increased by $\Delta t_L$, adjusting the OB timeslot length according to methods in which;

when $\Delta t_L<$a first threshold, sending, by the master node, control frames and data frames in a current manner;

when the first threshold$\leq\Delta t_L<$a second threshold, sending, by the master node, as first frames, a control frame and a data frame by delaying for $\Delta t_L$ in each loop cycle, and sending a last control frame, which comprises an additional idle code having a time length of $\Delta t_L$, in each loop cycle;

when the second threshold$\leq\Delta t_L<$a third threshold, increasing, by the master node, a value of T or $T_1$ by $\Delta t_L/N$ and remaining N unchanged to make the loop length equal to an integral multiple of the OB timeslot length, and if the requirement of the integral multiple is not met, adjusting a time at which the control frames are sent in accordance with the previous two methods; and when $\Delta t_L \geq$ the third threshold, re-calculating, by the master node, a least one of N, T and $T_1$, in order to make the loop length equal to the integral multiple of the OB timeslot length again.

19. The non-transitory computer storage medium according to claim 14, wherein the method further comprises:

a step of measuring, during the initialization of the OBTN, a loop length of a control channel, which comprises:

sending, by the master node, a header of a control frame at time $t_3$, and after the control frame are sequentially transferred by respective nodes in a loop network, receiving, by the master node, the header of the control frame at time $t_4$, the loop length of the control channel being $t_4-t_3$.

20. The non-transitory computer storage medium according to claim 15, wherein the OB timeslot length is calculated according to the result of the measurement of the loop length by means of the following formulae:

$t_L = (T+T_1) \times N$, $T \leq T_{max}$, and $T_1 \geq T_{1min}$, where $t_L$ represents the loop length of the data channel, T represents the length of the OB packet, $T_1$ represents a guard interval between the OB packets, $T=T_1$ represents the OB timeslot length, and N is a positive integer and represents that $t_L$ is a multiple of the OB timeslot length; $T_{max}$ represents a maximum value of the length of the OB packet; and $T_{1min}$ represents a minimum value of the guard interval between the OB packets.

* * * * *